(12) United States Patent
Paxton

(10) Patent No.: US 9,861,083 B2
(45) Date of Patent: Jan. 9, 2018

(54) WATER FILTER

(75) Inventor: Andrew Paxton, Taunton (GB)

(73) Assignee: INTERPET LTD., Dorking Surrey (GB)

( * ) Notice: Subject to any disclaimer, the term of this patent is extended or adjusted under 35 U.S.C. 154(b) by 792 days.

(21) Appl. No.: 13/580,142

(22) PCT Filed: Feb. 24, 2011

(86) PCT No.: PCT/IB2011/050787
§ 371 (c)(1),
(2), (4) Date: Aug. 20, 2012

(87) PCT Pub. No.: WO2011/104686
PCT Pub. Date: Sep. 1, 2011

(65) Prior Publication Data
US 2012/0318755 A1    Dec. 20, 2012

(30) Foreign Application Priority Data

Feb. 24, 2010 (GB) .................................. 1003110.2

(51) Int. Cl.
| | | |
|---|---|---|
| A01K 63/00 | (2017.01) | |
| A01K 63/04 | (2006.01) | |
| B01D 24/16 | (2006.01) | |
| B01D 35/06 | (2006.01) | |

(52) U.S. Cl.
CPC .......... *A01K 63/045* (2013.01); *B01D 24/165* (2013.01); *B01D 35/06* (2013.01); *B01D 2201/06* (2013.01)

(58) Field of Classification Search
CPC ..... A01K 63/045; B01D 24/165; B01D 35/06
See application file for complete search history.

(56) References Cited

U.S. PATENT DOCUMENTS

| | | | | |
|---|---|---|---|---|
| 2,107,406 | A | * | 2/1938 | Wood ..................... B01D 29/15 |
| | | | | 210/412 |
| 2,256,949 | A | * | 9/1941 | McKinney ..................... 366/221 |
| 2,315,681 | A | | 4/1943 | Weisgerber |
| 2,462,612 | A | | 2/1949 | Craig |

(Continued)

FOREIGN PATENT DOCUMENTS

| | | | |
|---|---|---|---|
| GB | 903800 | 8/1962 | |
| WO | 2006/0046037 | 5/2006 | |
| WO | WO 2006046037 A1 * | 5/2006 | ........... A01K 63/045 |

OTHER PUBLICATIONS

"Doctor Blades" http://printwiki.org/Doctor_Blade.*
"Shaped Wire Products", BMA Metals Group, http://www.bmametals.com/metal-wire/shaped-wire.aspx.*

*Primary Examiner* — Chester T Barry
(74) *Attorney, Agent, or Firm* — Crose Law LLC; Bradley D. Crose

(57) ABSTRACT

Water filters which comprise a multitude of discrete filter media elements in a chamber require periodic cleaning. However, the elements tend to become adhered to one another and to the interior surface of the chamber. The invention provides a water filter for use with ponds, comprising a filter chamber for containing filter media, and a first movable cutting member provided substantially immediately adjacent the interior wall of the chamber for movement across the surface of the interior surface of the wall to break the adherence of filter media to the interior wall.

14 Claims, 3 Drawing Sheets

(56) References Cited

U.S. PATENT DOCUMENTS

| | | | | | |
|---|---|---|---|---|---|
| 2,946,444 | A | * | 7/1960 | Zievers | B01D 29/118 100/117 |
| 3,522,886 | A | * | 8/1970 | Edmiston | B01D 25/24 210/345 |
| 4,714,557 | A | * | 12/1987 | Croket | B01D 29/23 100/211 |
| 5,961,213 | A | * | 10/1999 | Tsuyuki | B01F 13/0827 366/273 |
| 6,102,978 | A | * | 8/2000 | Butler | B01D 46/0067 156/556 |
| 6,386,752 | B1 | * | 5/2002 | Hagino | B01D 17/00 210/205 |
| 2006/0087912 | A1 | * | 4/2006 | Tague | B01F 7/1665 366/139 |
| 2009/0050580 | A1 | * | 2/2009 | Takao | B01D 33/073 210/784 |

\* cited by examiner

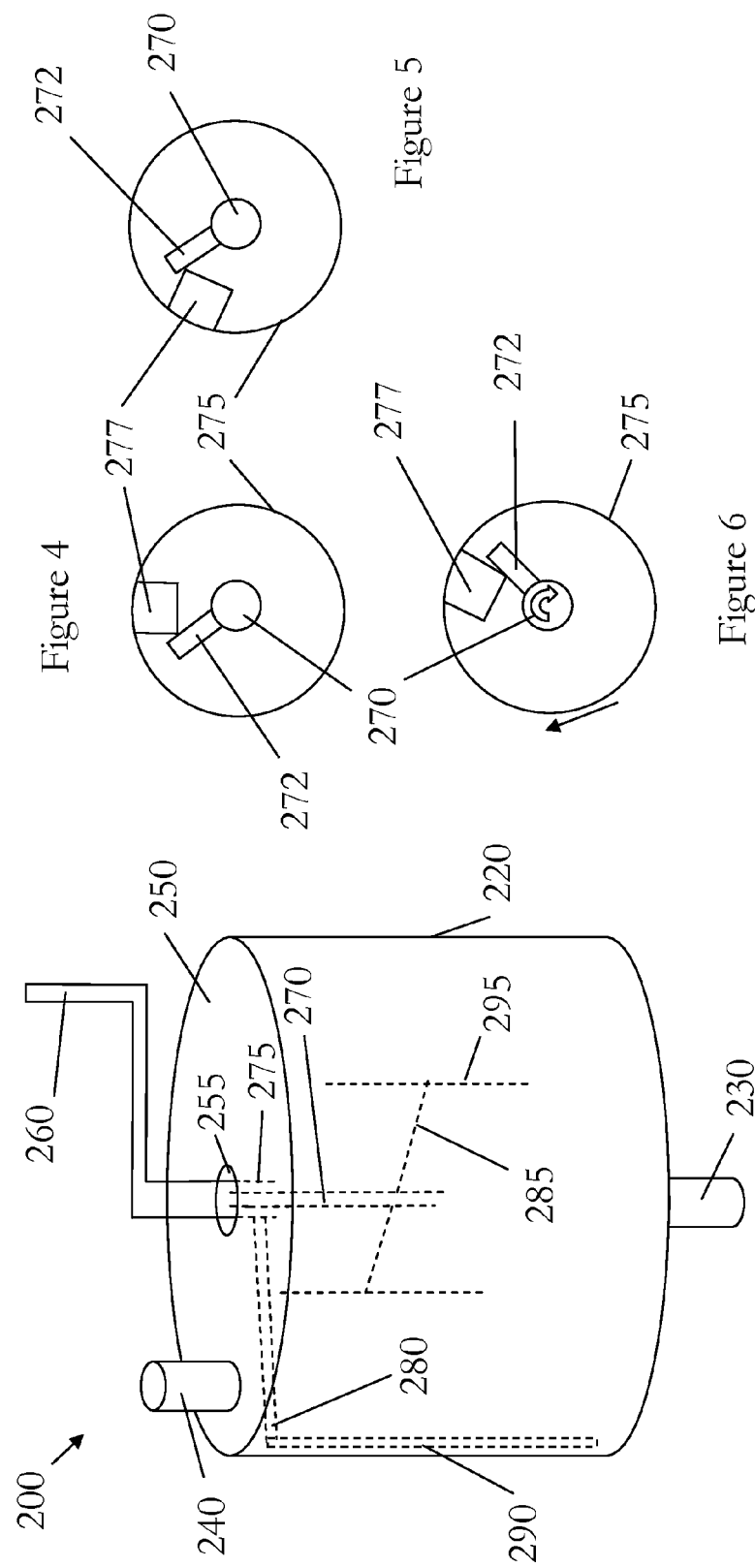

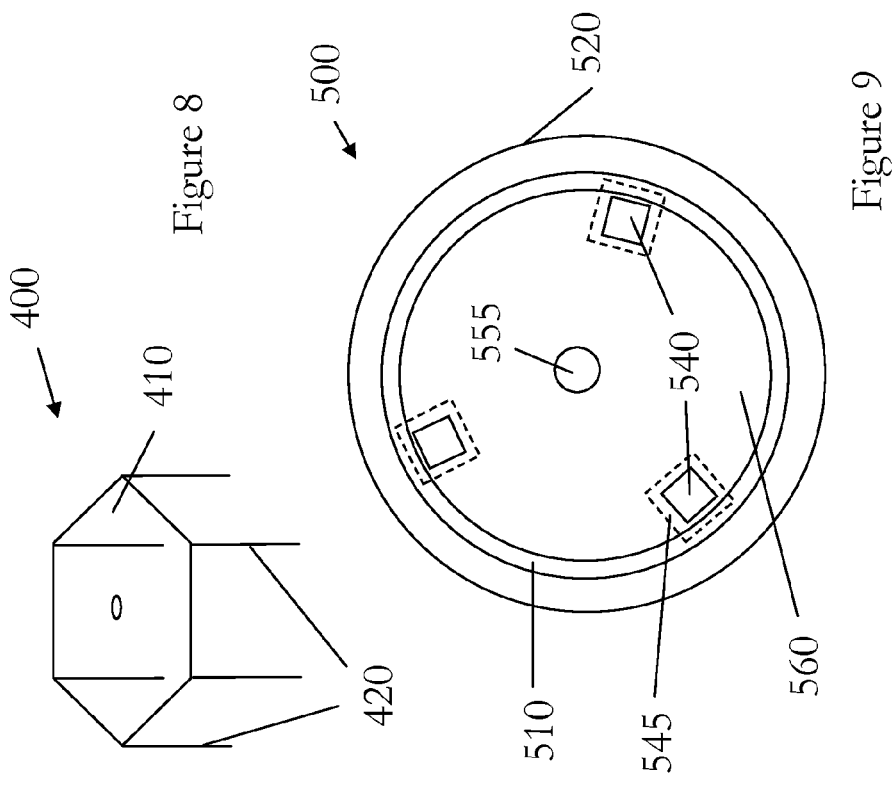
Figure 8
Figure 9
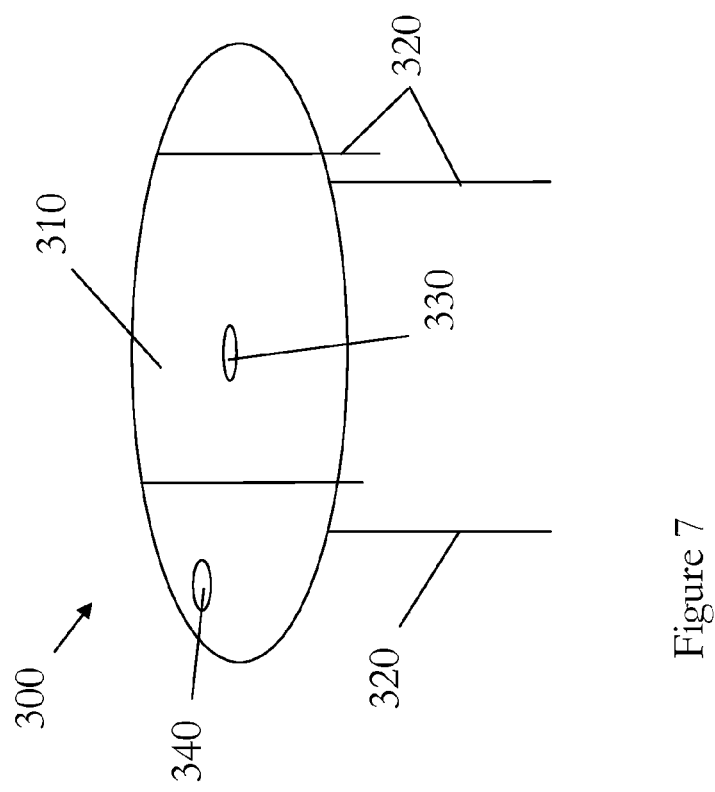
Figure 7

WATER FILTER

FIELD OF THE INVENTION

The present invention relates generally to a water filter and a method of cleaning a plurality of filter media elements in a water filter, and finds particular, although not exclusive, utility in pond and aquaria water filter systems.

BACKGROUND OF THE INVENTION

The water in ponds and aquaria tends to become dirty over time due to an accumulation of algae and other debris. Accordingly, water filters are known which include a chamber including filter media. The filter media may comprise open cell foam, sand, or other elements some, or all, of which may be substantially inert relative to the water. The water is passed through the filter chamber, and hence the filter media, such that the debris is substantially removed from it. However, over time the accumulation of debris reduces the efficiency of the filter media such that either the exiting water remains dirty or such that the filter media becomes effectively blocked. This results in water overflowing, or by-passing, the filter media. Alternatively, or additionally, the flow-rate through the filter media may become reduced due to back-pressure created in the system. When this occurs the filter media needs to be cleaned.

There are several different ways in which filter media may be cleaned. One way is to remove the filter media and wash it. This is relatively easy for homogenous filter media such as blocks of open cell foam. Another way is to temporarily reverse the flow of water through the chamber using fresh water and redirect the exiting water away from the pond.

These methods do provide some cleaning of the filter media but where it is comprised of a plurality (possibly a multitude) of discrete elements it is time consuming and difficult for a user to remove them from the chamber and wash them. Moreover, the discrete elements tend to clump together into a "block" due to the accretion of debris. If reverse flow is used solely as a cleaning method channels within the block are created but the elements substantially stay adhered to one another. Such a "block" of elements has severely reduced filtering properties and accordingly, during cleaning it is important that the block is broken up into its constituent elements.

One way to do this is to use paddles which may be rotated within the block. However, the paddles are provided in the filter chamber before filtering operations commence and thus become embedded in the "block". Rotation of the paddles usually results in only partial break-up of the "block".

Discrete filter media elements also tend to adhere to the interior walls of the filter chamber. This may include the side wall(s) and/or the base, and/or if the media floats, the lid. If typical cleaning methods are used such as reverse flow or paddles, some of the elements remain adhered to the interior walls and act as "seeding points" for adhesion of further elements after the resumption of filtering operations.

Accordingly, there is a need for improved apparatus for the breaking up of discrete filter media elements to improve the cleaning of water filters.

BRIEF SUMMARY OF THE INVENTION

In a first aspect, there is provided a water filter for use with ponds, comprising a filter chamber for containing filter media, and a first movable cutting member provided substantially immediately adjacent the interior surface of the wall of the chamber for movement across the surface of the interior wall to break the adherence of filter media to the interior wall.

The term "ponds" includes aquaria, pools, and any other body of water. The filter chamber may be substantially cylindrical in shape, although other shapes are contemplated. The chamber has walls defining its interior within which the filter media may be present. Filter media is taken to mean a filter for physically filtering the water, although it is contemplated that in some circumstances the media may also chemically and/or biologically interact with the water. Movement across the surface of the interior wall may mean substantially parallel to the interior surface. It may be the entire surface of the interior wall or only a portion of one wall.

The first cutting member may move along the boundary substantially between the wall and the filter media to break the adherence of the one to the other. This may be around the inside of the side wall(s) of the chamber and/or the lid and/or base walls of the chamber.

The first cutting member may comprise one or more substantially filamentous elements. In this respect, the term "filamentous" includes wires having a diameter of less than 6 mm, preferably 1 to 4 mm.

The cutting member may also be planar in shape. It may have a thickness of less than 6 mm, preferably 1 to 4 mm, and a width of approximately 10 mm.

The water filter may comprise one or more second movable cutting members for agitation of the filter media. These may lie radially within the first cutting member. The second cutting members may have the same, or similar, dimensions as the first cutting member; however, they may have different dimensions. In one embodiment, at least one of the second cutting members may be a paddle in that it has a substantially larger surface area than the first cutting member.

The one or more second cutting members may be provided substantially horizontally or vertically. These terms are in relation to the typical use of the water filter and have their usual meanings, such as horizontal being substantially parallel to the Earth's surface.

The one or more second cutting members may comprise two substantially circular filamentous elements and at least one filamentous element arranged between the two. The at least one filamentous element arranged between the two may be the first cutting member, or at least, similarly arranged within the chamber. In this regard, the term circular includes hexagonal and other substantially closed-loop polygonal shapes.

The one or more second cutting members may comprise at least one paddle. These may be used to stir the filter media and thus promote the break-up of elements adhered to one another.

The water filter may further comprise a movement means for moving the first cutting member, or the first cutting member and the second cutting members from outside the chamber. In at least one embodiment, the movement means is a movement mechanism. For instance, a rotatable shaft or axle from which the first and second cutting member(s) may project may be provided. The shaft may protrude through a wall (or lid) of the chamber and a handle or other means of manually rotating the shaft may be provided. Alternatively, or additionally, the shaft may be rotated by powered means such as an electric motor.

The invention described herein also contemplates the possibility that the cutting members remain stationary and the chamber moves relative to it. In this regard, the term "movable cutting member" is taken to mean that the movement is relative between the chamber and cutting member(s). Accordingly, all references to movement of the shaft should also be construed as meaning that the movement means may move the chamber relative to the shaft/cutting member(s).

In one embodiment, the movement means and the cutting member(s) may not be physically in contact with one another. In this respect, a shaft may still be provided, from which the cutting members project; however, the shaft may not protrude through the lid or wall. This may prevent leaks and generally improve the mechanical reliability of the apparatus due to the absence of seals, bearings and the like. The handle or motor may still be provided outside the chamber and means of interconnection between the handle outside and the shaft inside the chamber may be provided. For example, one of the movement means and the cutting member(s) may comprise a magnet and the other of the movement means and cutting member(s) may comprise a ferromagnetic element and/or a magnet. In this way, rotation of the movement means (for instance, the handle) may cause rotation of the shaft due to the magnetic attraction of the two parts. In this regard, the term "magnet" includes an electromagnet.

Although a shaft has been described with regard to the embodiment in which the movement means and the cutting member(s) may not be physically in contact with one another, it is possible that no shaft is present. Rather, the cutting member(s) may be held substantially loosely within the chamber but able to move and/or rotate therein due to the action of magnetic attraction between the movement means and the cutting member(s). A track may be provided in or on the lid within which the movement means may move outside the chamber and/or within which the cutting member(s) may move within the chamber.

The movement means may be arranged to move the first cutting member before moving the second cutting member(s). In this way, the boundary adhesion between the filter media elements and the interior surface of the wall of the chamber may be broken initially. Then, when the second cutting members are moved the block comprised of a multitude of elements may be broken-up.

The movement means may include lost motion means to achieve this. Alternatively, the water filter may comprise two movement means, one for the first cutting member and one for the second cutting member(s).

The water filter may comprise a plurality of substantially inert elements.

In a second aspect, the invention provides a method of cleaning a plurality of filter media elements in a water filter, comprising the steps of providing a water filter according to the first aspect and as described and/or claimed herein, providing a plurality of substantially inert filter media elements in the filter chamber, and moving the first cutting member to break the adhesion of the filter media elements to the interior wall of the chamber.

The method may further comprise the step of moving the first and second cutting members to agitate the filter media elements. This step may be achieved, for example, by the lost motion means described herein.

The water filter may include a water inlet and a water outlet, and during typical filtering operation the water may flow into the filter chamber through the inlet and exit via the outlet; the method of cleaning a plurality of filter media elements may thus further comprise the step of reversing the flow of water such that it may enter through the outlet and exit through the inlet. This reverse flow may help to break-up the elements and remove the debris therefrom.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

FIG. 3 is a perspective view of a different water filter;
FIGS. 4 to 6 are a sequence of plan views of a lost motion device for use with a water filter;
FIGS. 7 and 8 are perspective views of different cutting members;
and
FIG. 9 is a plan view of the top of another water filter.

DETAILED DESCRIPTION OF THE INVENTION

Figure 2:
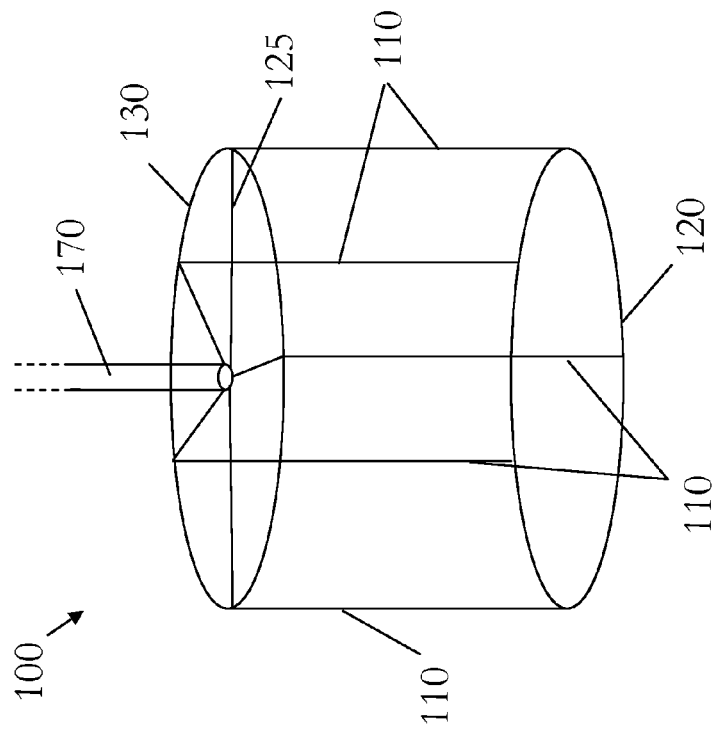
FIG. 2 is a perspective view of a cutting member.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may refer to different embodiments. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Figure 1:
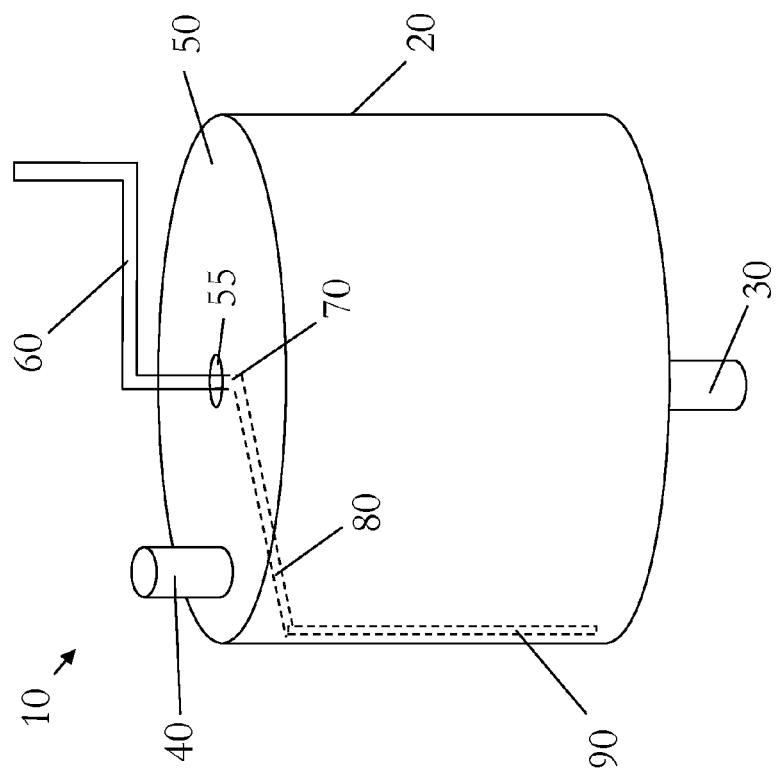
FIG. 1 is a perspective view of a water filter.

In FIG. 1, a water filter 10 comprises a drum shaped chamber 20 having a cylindrical body and an end wall 50 at either end thereof. The chamber 20 is fed with water via inlet 30 and cleaned water exits via outlet 40. Although FIG. 1 shows the inlet 30 at the base and the outlet 40 at the top their relative positions may be reversed or occupy other locations relative to the chamber, such as at the sides. In use, the chamber 20 will be at least partially full of discrete filter media (not shown for the sake of clarity). A grid, not shown, may be included at the top and/or bottom of the chamber 20 to prevent the filter media from being washed out. A cutting member 90 is provided adjacent the inside surface of the wall of the body of the chamber 20. This cutting member 90 is provided at the end of a radially extending arm 80 which, in turn, is provided at the end of a vertical shaft or axle 70. This shaft 70 extends through a hole 55 in the centre of the end wall (lid) 50 of the chamber 20 from outside the chamber 20. The arm 80 is shown substantially adjacent the underside of the lid or top wall of the chamber 20. However, it is contemplated that the position of this arm 80 may be at any height within the chamber 20. The arm 80 may be a cutting member.

At the end of the shaft 70 outside the chamber 20 a handle 60 is provided. In use, the handle 60 is turned about the shaft's 70 longitudinal axis such that the cutting member(s) 80, 90 are moved across the inside surface of the walls of the chamber 20. The cutting members 80, 90 may touch the inside walls, or may be provided immediately adjacent but not in contact with the walls themselves.

In this way, any of the filter elements adhering to the interior surface of the walls of the chamber 20 will be removed thus breaking the seal between the block of filter elements and the chamber. Following this step, the filter elements may be further agitated by other means, such as paddles, other cutting elements, reverse water flow, etc.

The cutting member 90 in FIG. 1 is shown as a single filamentous-like element. However, it may have other shapes and sizes, such as a relatively thin planar element (for example having a height:width:thickness ratio of 10:1:0.2).

Another example is shown in FIG. 2 wherein the cutting member 100 is an arrangement of filamentous elements 110 provided between the two substantially circular filaments 120, 130. The upper circular filament 130 is attached to a shaft 170 by means of radially extending spokes 125. Radial arms (not shown) may also be provided between the lower circular filament 130 and the shaft 170. The overall shape of the cutting member arrangement 100 resembles a drum similar is shape and size to that of the water filter chamber 20 shown in FIG. 1 such that it will fit inside the chamber 20 with the cutting members 110 adjacent the interior surface of the wall of the chamber 20.

In this manner, when rotated about the shaft 170, the five cutting element 110 will each cut away, or break the adherence of, a portion of the filter media elements from the interior surface of the chamber 20 wall.

The upper 130 and lower 120 circular filaments may be provided within the block of filter media elements such that rotation of the whole arrangement 100 not only breaks the seal between the filter media elements and the interior surface of the chamber wall but also (due to the radial arms 125) cut the block up into two, or three layers. This further aids the break up of the block of filter media elements as a whole. The radial arms 125 may be provided substantially immediately adjacent the underside of the top or lid of the chamber such that their rotation breaks the adhesion between the block and the lid. Moreover, the lower radial arms may be provided adjacent the lower wall or base of the chamber to break any adhesion in this area.

An alternative water filter 200 is shown in FIG. 3. This water filter 200 has a chamber 220 including an inlet 230 and an outlet 240 in a similar manner to that shown in FIG. 1. Moreover, the filter 200 has a cutting member 290 provided, at the end of a radially extending arm 280, substantially immediately adjacent the surface of the interior wall of the chamber 220. The arm 280 extends radially away from a central hollow shaft 275 which depends through a hole 255 in the end wall (lid) 250 of the chamber 220. The arm 280 may be provided immediately adjacent the underside of the lid or top wall 250 of the chamber 220.

Two further cutting members 295 are provided each at the end of a radially extending arm 285. These arms 285 have a shorter length than the arm 280 and as such the cutting members 295 are provided approximately half way between the centre of the chamber 220 (where the shaft 270 is located) and the outside wall of the chamber 220.

These arms 285 are attached or connected to a central shaft 270 which is a provided radially inwardly of the hollow shaft 275. The two shafts 270, 275 may rotate, for the most part, independently of one another, as will be explained in more detail below.

A handle 260 is provided outside of the chamber 220 for rotation of the outer shaft 275.

With reference to FIGS. 4 to 6 the inner shaft 270 includes a radially extending lug 272. This lug 272 extends radially outwardly and away from the shaft 270 and within the confines of the outer shaft 275.

The outer shaft 275 includes an inwardly extending lug 277 which extends from the inner surface of the hollow shaft 275 towards the shaft 270. The two lugs 272, 277 are of suitable size and arrangement such that they will collide with one another in certain circumstances as will be explained.

In FIG. 4, the shafts 270, 275 are at rest in their initial positions relative to one another. In this state the lug 277 is circumferentially in front of (in a clock-wise direction) the lug 272. Accordingly, rotation of the handle 260 will rotate the shaft 275 and rotate the first cutting member 290 within the chamber 220. However, no rotation of the further cutting members 295 will occur because no torque is being applied to the inner shaft 270.

When the lug 277 has rotated almost completely once about the shaft 270 it will collide with the lug 272 (FIG. 5) and thus further rotation of the handle 260 will rotate the shaft 270 and the shaft 275 and thus all the cutting members 290 will rotate within the chamber 220 (FIG. 6).

The apparatus may include biasing means (not shown) for returning the outer 275 and inner 270 shafts to their initial position (FIG. 4) once the torque is no longer applied via the handle 260. This will be possible because by the end of the cleaning process the filter elements will be loosely arranged allowing free rotation of the cutting members 295 back to their initial positions (FIG. 4). Such biasing means may include a spring.

This arrangement allows for the "seal" between the filter media elements in the chamber 220 and the interior surface of the chamber 220 wall to be broken before further agitation of the elements by the further cutting members 295.

Although these further cutting members 295 are shown as filamentous in form they may have other forms/shapes such that they resemble paddles or stirrers.

In one embodiment, the cutting member 290 is a blade which has a relatively sharp leading edge arranged substantially adjacent the interior surface of the chamber 220 wall and a body which extends radially inward (although not necessarily perpendicularly to the tangential of the chamber wall). The arm 280 may be a cutting member.

Other arrangements to provide lost motion between the cutting member 290 and the further cutting members 295 are contemplated such as independent drive means.

In another embodiment (see FIG. 7), the water filter may comprise an arrangement 300 of cutting members 320 in the form of four rectilinear filamentous elements depending from a substantially circular disc member 310. This disc 310 includes a magnet or ferromagnetic member 340 arranged on its upper surface. The disc includes a means 330 for connection with a shaft or axle (not shown), to allow rotation of the arrangement 300, at its centre. The magnet or ferromagnetic member 340 allows rotation of the arrangement 300 from outside the chamber as will be explained in more detail below.

Another possible shape, other than a disc, is shown in FIG. 8. The arrangement 400 includes a member 410 which is substantially hexagonal in shape with six depending filamentous cutting members 420 depending from each "corner" thereof.

In FIG. 9, a plan view of a chamber wall 520 is shown as the outer most circle. Within this chamber wall 520 an upper disc member 510 is provided within the chamber 520. This disc member 510 may be similar to the one shown in FIG. 7 such that it includes one or more depending cutting members 320.

On the surface of this disc member 510 three magnets or ferromagnetic members 545 are provided equally spaced radially about the circumference of the disc 510.

Outside of the chamber 520 a further disc 560 (the inner circle shown) is provided adjacent the upper surface (the lid or end wall) of the chamber. This disc 560 includes three magnets or ferromagnetic members 540 which lie substantially at the same radius from the centre of the disc 560 as the magnets or ferromagnetic members 545 arranged around the disc 510 within the chamber 520.

In use, the upper, outer disc 560 may be rotated about a central axle 555. This, in turn produces rotation of the disc 510 within the chamber 520 due to the interaction of the magnets or ferromagnetic members 540, 545.

In this way, the filter media elements may be broken away from the interior surface of the chamber wall and agitated to allow cleaning thereof, without the need for a hole in the lid of the chamber to allow access for a shaft. This prevents unnecessary and undesirable leaks from the chamber, and/or the requirement for elaborate seals around the shaft, and/or the fouling of the shaft and any bearings included therein.

Alternatively, the arrangement of cutting members within the chamber may resemble the one shown in FIG. 2. In this case, the ferromagnetic members or magnets 545 may be attached to the upper circular member 130 or the radial arms 125.

Another possibility, not shown, is that only one ferromagnetic member or magnet 540, 545 is provided inside and outside of the chamber 520 and the one 540 outside the chamber 520 is moved around a track on or in the surface of the lid. The disc member 510 may include the ferromagnetic member or magnet 545 inside the chamber and it may be arranged such that it rotates around a circular track provided on the underside of the lid substantially radially aligned with the track on the upper surface of the lid.

Any of the embodiments described herein may be used with other filter means such as UV lamps, and pumps, and may be submersible. The water filter may include a means of providing chemicals or other substances (dosing) to the water.

What is claimed is:

1. A water filter for use with any body of water and aquaria, comprising:
   a filter chamber for containing filter media, the filter chamber having a water-impermeable side wall with an interior surface;
   a water inlet permitting water to flow into the filter chamber;
   a water outlet permitting water to exit the filter chamber;
   wherein the water inlet is located at the base of the filter chamber and the water outlet is located at the top of the filter chamber; and
   the water filter further comprising:
   a first movable wire having a round cross-section and a diameter of less than 6 mm, wherein:
   the first movable wire depends vertically within the chamber with a longitudinal axis thereof substantially vertically oriented and substantially parallel to the interior surface of the side wall;
   the first movable wire depending vertically within the chamber from a top of the chamber to a base of the chamber;

the first movable wire substantially immediately adjacent the interior surface of the side wall of the chamber along a length of the first movable wire, and configured to move across the interior surface of the side wall to break the adherence of filter media to the interior surface of the side wall.

2. The water filter of claim 1, comprising one or more second movable cutting members for agitation of the filter media.

3. The water filter of claim 2, wherein the one or more second movable cutting members are provided substantially horizontally or vertically.

4. The water filter of claim 2, wherein the one or more second movable cutting members comprise two substantially circular filamentous elements and at least one filamentous element arranged between the two.

5. The water filter of claim 2, wherein the one or more second movable cutting members comprise at least one paddle.

6. The water filter of claim 2, further comprising a movement mechanism for moving the first movable wire, or the first movable wire and the second movable cutting members from outside the chamber.

7. The water filter of claim 6, wherein the movement mechanism is not physically in contact with the first movable wire and/or second movable cutting member.

8. The water filter of claim 7, wherein one of the movement mechanism and the first movable wire and/or second movable cutting member comprises a magnet and the other of the movement mechanism and the first movable wire and/or second movable cutting member comprises a ferromagnetic element and/or a magnet.

9. The water filter of claim 6, wherein the movement mechanism is arranged to move the first movable wire before moving the second movable cutting member.

10. The water filter of claim 9, wherein the movement mechanism includes a lost motion arrangement.

11. The water filter of claim 1 including filter media comprising a plurality of substantially inert elements.

12. A method of cleaning a plurality of filter media elements in a water filter, comprising the steps of providing a water filter according to claim 1, providing a plurality of substantially inert filter media elements in the filter chamber, and moving the first movable wire to break the adhesion of the filter media elements to the interior wall of the chamber.

13. The method of claim 12, wherein the water filter comprises one or more second movable cutting members for agitation of the filter media, the method further comprising the step of moving the first movable wire and second movable cutting members to agitate the filter media elements.

14. The method of claim 12, wherein the water filter includes a water inlet and a water outlet, and during typical filtering operation the water flows into the filter chamber through the inlet and exits via the outlet, the method further comprising a subsequent step of reversing the flow of water such that it enters through the outlet and exits through the inlet.

\* \* \* \* \*